United States Patent

[11] 3,604,877

[72] Inventor John R. Cockshutt
Red Bank, N.J.
[21] Appl. No. 881,510
[22] Filed Dec. 2, 1969
[45] Patented Sept. 14, 1971
[73] Assignee Engelhard Minerals & Chemicals Corporation

[54] ELECTRICAL CONTACT ASSEMBLY
1 Claim, 3 Drawing Figs.

[52] U.S. Cl. ........................ 200/166 C, 29/630 C
[51] Int. Cl. ........................ H01h 1/02
[50] Field of Search ........................ 200/166 C; 29/630 C; 174/68.5

[56] References Cited

UNITED STATES PATENTS

| | | | |
|---|---|---|---|
| 3,103,547 | 9/1963 | Ansley | 174/68.5 |
| 3,159,906 | 12/1964 | Telfer | 174/68.5 X |
| 3,311,729 | 3/1967 | Duell, Jr. | 200/166 C |
| 3,321,570 | 5/1967 | Webb | 174/68.5 |

*Primary Examiner*—H. O. Jones
*Attorneys*—Samuel Kahn and John G. Kovalich

ABSTRACT: An electrical contact assembly comprising an electrical contact of the rivet type mounted in an aperture in a metal arm. The shank of the contact being provided with an end portion composed of a metal solder which when staked against the metal arm and subsequently heated provides a solder joint in the form of a fillet between the staked end and the metal arm.

INVENTOR.
JOHN R. COCKSHUTT
BY John G. Kovalick
AGENT

ELECTRICAL CONTACT ASSEMBLY

BACKGROUND OF THE INVENTION

Electrical contacts of the rivet type with the rivet head composed in part of a contact metal selected for its electrical performance, e.g. a bimetallic head having a surface layer of silver and the remaining portion of the head and the shank composed of a metal different from the contact metal, e.g. copper, are well known as evidenced by U.S. Pat. No. 3,026,603. Electrical contacts of the rivet type having a contact metal at the free end of the shank as well as a contact metal surface layer on the head are also well known as evidenced by U.S. Pat. No. 3,311,729. Such contacts are generally mounted on a contact arm and mechanically secured on the contact arm through an aperture therein by cold staking the end portion of the shank passing through the aperture into abutment with the surface of the arm surrounding the aperture. It has been experienced during operation of the contact for substantial periods that the mechanical securing of the contact to the arm is sometimes subject to loosening with the result that the contact does not operate efficiently and otherwise electrical conductivity is adversely influenced by oxidation of the shank portion which undesirably increases the electrical resistance of the assembly. The present invention contemplates the provision of an electrical contact assembly which obviates such a disadvantage.

SUMMARY OF THE INVENTION

In accordance with the invention there is provided an electrical contact assembly comprising a contact of the rivet type having a metal head and a metal shank with a portion of the shank at the free end thereof composed of a metal solder having a lower melting point than the metal of the head and the metal of the shank between the solder portion of the shank and the head. The contact assembly of the invention comprises a metal arm as a metal strip material having an aperture formed therethrough, the shank of the rivet passing through the aperture with the head abutting one face of the arm adjacent the aperture and the free end solder portion of the shank and a part of shank between the solder portion and the head being cold-formed or staked in the form of a second head in abutment with the opposite face of the strip or arm adjacent the aperture, a portion of the solder from the staked free-end portion being in the form of a fillet forming a soldered joint between the staked part of the shank between the solder portion and the head and the metal arm.

DESCRIPTION OF THE PREFERRED EMBODIMENTS

Figure 1:
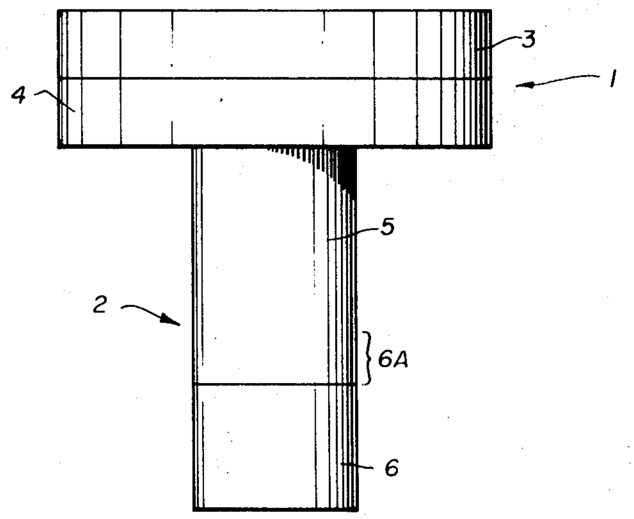
FIG. 1 illustrates an elevational view of an electrical contact of the rivet type according to the invention.

Referring to FIG. 1, the electrical contact of the invention is in the form of a rivet having a rivet head 1 and a rivet shank 2. The rivet head 1 is preferably in the form of a bimetallic head having a surface layer 3 composed of a contact metal, e.g. silver, silver alloy, a platinum group metal especially platinum or palladium, gold or a gold alloy, or a tungsten-molybdenum alloy. The contact metal surface layer is mounted on a backing layer 4 composed of a metal different from the contact metal, e.g. a base metal such as copper, bronze, brass or steel and the shank 2 extends from the backing layer. The portion 5 of shank 2 which is adjacent the head 1 is preferably composed of a metal identical with that of the backing layer 4, and the free end portion 6 of the shank is composed of a metal solder having a lower melting point than the metal of the head 1 and the metal of the shank portion 5. In a modified form, the head may be composed as a single head of a contact metal, e.g. silver, instead of being in the bimetallic form illustrated, and the shank portion 5 may be composed of the same metal or a different metal, e.g. copper. The free end portion 6 is composed of solder alloys such as 15% Ag–80% Cu–5% P, 35% Ag–26% Cu–21% Zn–18% Cd, 45% Ag–15% Cu–16% Zn–24% Cd, 5% Ag–16.6% Zn–78.4% Cd, 5% Ag–95% Cd, 56% Ag–22% Cu–17% Zn–5% Sn. The selection of a suitable solder composition for the free end 6 will depend upon the permissible temperatures to which the contact assembly illustrated by FIG. 3 is subjected during fabrication or during use.

Figure 2:
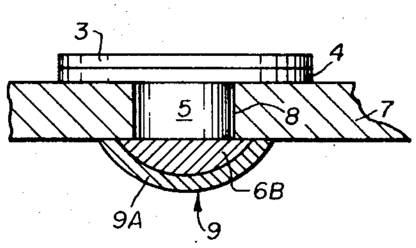
FIG. 2 illustrates a partly cross-sectional and partly elevational view showing an electrical contact assembly according to the invention in an intermediate stage of completion.
Figure 3:
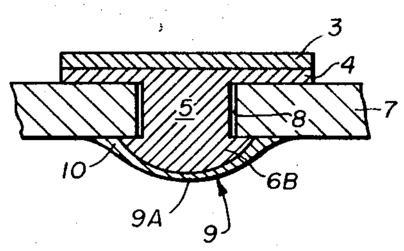
FIG. 3 illustrates a cross-sectional view of a completed electrical contact assembly according to the invention.

Regarding FIGS. 2 and 3, a metal contact strip or arm 7, e.g. an arm of copper, bronze, brass or steel, is provided with an aperture formed therethrough and defined by aperture wall 8. The rivet of FIG. 1 is inserted into the aperture with the backing layer 4 abutting one side of the strip or arm adjacent the aperture and the free end 6 together with a part 6A of the remaining portion of the shank is mechanically staked or deformed into a second head 9 in abutment with the opposite side of the arm adjacent the aperture to form a contact assembly in an intermediate stage of completion as illustrated by FIG. 2. In accordance with FIG. 2, the staked head 9 comprises a core 6B staked from the stem portion 6A and a crown 9A of solder encasing the core 6B and in contact with the adjacent surface of arm 7.

Having mechanically secured the contact to the arm 7 as illustrated by FIG. 2, the contact assembly is heated sufficiently, e.g. in an oven, with the head 9 uppermost, to cause the solder crown 9A from the solder head 9 to melt and to flow thereby forming a fillet 10 adjacent the staked part 6B and adjacent portions of the arm 7 and thereby providing a solder joint therebetween.

It is claimed:

1. An electrical contact assembly comprising an electrical contact of the rivet type having a metal head and a metal shank joined to the head with a portion of the shank at the free end thereof composed of a metal solder having a lower melting point than the metal of the head and the metal of the shank portion adjacent the head, a metal arm having an aperture therethrough defined by an aperture wall, the shank of the rivet passing through the aperture with the head abutting one side of the arm adjacent the aperture, the free end solder portion of the shank and a part of the shank between the solder portion and the head of the shank being staked in abutment with the opposite side of the arm adjacent the aperture, a portion of the solder from the staked free-end portion being in the form of a fillet forming a soldered joint between the staked part of the shank between the solder portion and the head and the metal arm.